(12) United States Patent
Miyamoto et al.

(10) Patent No.: US 9,885,201 B2
(45) Date of Patent: Feb. 6, 2018

(54) LOCK DEVICE FOR LINEAR MOTION ROD

(71) Applicant: SMC CORPORATION, Chiyoda-ku (JP)

(72) Inventors: Mitsuo Miyamoto, Toride (JP); Masayuki Kudo, Joso (JP)

(73) Assignee: SMC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/102,199

(22) PCT Filed: Oct. 9, 2014

(86) PCT No.: PCT/JP2014/077035
§ 371 (c)(1),
(2) Date: Jun. 6, 2016

(87) PCT Pub. No.: WO2015/083440
PCT Pub. Date: Jun. 11, 2015

(65) Prior Publication Data
US 2016/0312502 A1    Oct. 27, 2016

(30) Foreign Application Priority Data
Dec. 6, 2013    (JP) .................................. 2013-253495

(51) Int. Cl.
*F15B 15/26*    (2006.01)
*E05C 1/08*    (2006.01)
(Continued)

(52) U.S. Cl.
CPC ................. *E05C 1/08* (2013.01); *B60T 1/062* (2013.01); *E05B 51/02* (2013.01); *E05B 55/00* (2013.01);
(Continued)

(58) Field of Classification Search
CPC .............. F04F 99/00; F16B 7/14; F16B 7/149
(Continued)

(56) References Cited

U.S. PATENT DOCUMENTS 4,981,069 A * 1/1991 Matsui .................. F15B 15/262
188/77 R
5,653,314 A   8/1997 Yamamoto et al.
(Continued)

FOREIGN PATENT DOCUMENTS

CN    1224809 A    8/1998
CN    1892052 A    1/2007
(Continued)

OTHER PUBLICATIONS

International Search Report dated Nov. 18, 2014 for PCT/JP2014/077035 filed on Oct. 9, 2014.
(Continued)

*Primary Examiner* — Christopher Schwartz
(74) *Attorney, Agent, or Firm* — Oblon, McClelland, Maier & Neustadt, L.L.P.

(57) ABSTRACT

A lock device body includes a brake member fastening a rod to lock the rod, a piston that press-opens a pair of pressure-bearing sections of the brake member by using an expansion member to unlock the rod, and an operation element for manually operating the piston, the operation element includes a shaft threaded in a screw hole, a pressure plate formed on one end of the shaft and located in the pressure chamber, and a sealing member disposed on the pressure plate. When the shaft is threaded into a lock release position, an operation end becomes an unextending state while the pressure plate displaces the piston to the lock release position, and, when the shaft is threaded back to a lock position, the operation end extends from the screw hole to the outside
(Continued)

while the sealing member seals the screw hole to isolate the screw hole from the pressure chamber.

12 Claims, 4 Drawing Sheets

(51) Int. Cl.
| | |
|---|---|
| *B60T 1/06* | (2006.01) |
| *E05B 51/02* | (2006.01) |
| *E05B 55/00* | (2006.01) |
| *E05B 61/00* | (2006.01) |
| *F16D 63/00* | (2006.01) |
| *F16D 49/10* | (2006.01) |
| *F16D 121/16* | (2012.01) |
| *F16D 125/66* | (2012.01) |

(52) U.S. Cl.
CPC .............. *E05B 61/00* (2013.01); *F15B 15/26* (2013.01); *F15B 15/262* (2013.01); *F16D 63/008* (2013.01); *F16D 49/10* (2013.01); *F16D 2121/16* (2013.01); *F16D 2125/66* (2013.01)

(58) Field of Classification Search
USPC ...... 92/15, 17, 18, 27, 28, 88; 188/67, 77 R, 188/106 F, 151 R, 265
See application file for complete search history.

(56) References Cited

U.S. PATENT DOCUMENTS

| | | |
|---|---|---|
| 6,178,870 B1 | 1/2001 | Takahashi |
| 6,659,678 B2 | 12/2003 | Takahashi et al. |
| 2007/0062368 A1 | 3/2007 | Takahashi et al. |

FOREIGN PATENT DOCUMENTS

| | | |
|---|---|---|
| CN | 102840191 A | 12/2012 |
| JP | 02-146202 U | 12/1990 |
| JP | 3027853 U | 8/1996 |
| JP | 11-037111 A | 2/1999 |
| JP | 2002-188666 A | 7/2002 |
| JP | 2002-266814 A | 9/2002 |
| JP | 2005-329531 | 12/2005 |
| JP | 2008-291880 A | 12/2008 |
| JP | 2009-068567 A | 4/2009 |

OTHER PUBLICATIONS

Combined Office Action and Search Report dated May 3, 2017 in Chinese Patent Application No. 201480066489.0 (with English translation of categories of cited documents).

* cited by examiner

LOCK DEVICE FOR LINEAR MOTION ROD

TECHNICAL FIELD

The present invention relates to a lock device mounted on a linear actuator such as a hydraulic cylinder having a linear motion rod for locking the rod during a non-operation state of the rod.

BACKGROUND ART

For example, as disclosed in PTL 1, a lock device for locking a linear motion rod of a hydraulic cylinder is conventionally and widely known that fixes a lock device body, through which a rod penetrates, to a rod exit of the hydraulic cylinder and that is provided, inside of the lock device body, with a brake member that fastens the rod. The brake member has a thick walled cylindrical shape with an inner diameter that is smaller than an outer diameter of the rod and includes an opening portion that is slit in an axis direction in a portion of the cylinder and a pair of pressure-bearing sections opposite each other on both sides of the opening portion. By pushing and opening the pair of pressure-bearing sections by driving a lock release piston provided inside the lock device body, the fastening of the rod with the brake member is released so as to unlock the lock, and when locking the rod, the piston is returned to fasten the rod by the elastic force of the brake member itself such that the rod is locked.

Describing in further detail, in the lock device, a taper-shaped expansion portion is inserted between a pair of pressure-bearing sections of the brake member through rollers. By providing the taper-shaped expansion portion in the lock release piston and by supplying and discharging a pressure fluid from the outside to a piston chamber defined inside the lock device body, the piston is driven. That is, the taper-shaped expansion portion is disposed such that by driving the piston with the pressure fluid supplied to the piston chamber, the taper-shaped expansion portion can be pushed in between the pair of rollers that abut the pressure-bearing section of the brake member. By pushing in the taper-shaped expansion portion, the pressure-bearing section is expanded such that the rod is unlocked. Upon discharge of the pressure fluid from the piston chamber, the piston is returned with biasing force of the return spring acting on the piston and with the elastic force of the brake member itself, the peripheral surface of the rod is fastened such that the rod is locked.

Such a lock device described above is expected to be capable of being unlocked and locked with the lock release piston while that unlocking and locking of the rod can be performed by manual operation. Furthermore, there is a lock device such as the lock device described above that is supplied to the market as a product with a configuration that enable locking and unlocking to be performed with a manual operation bolt 60 illustrated in FIG. 6.

Figure 6:
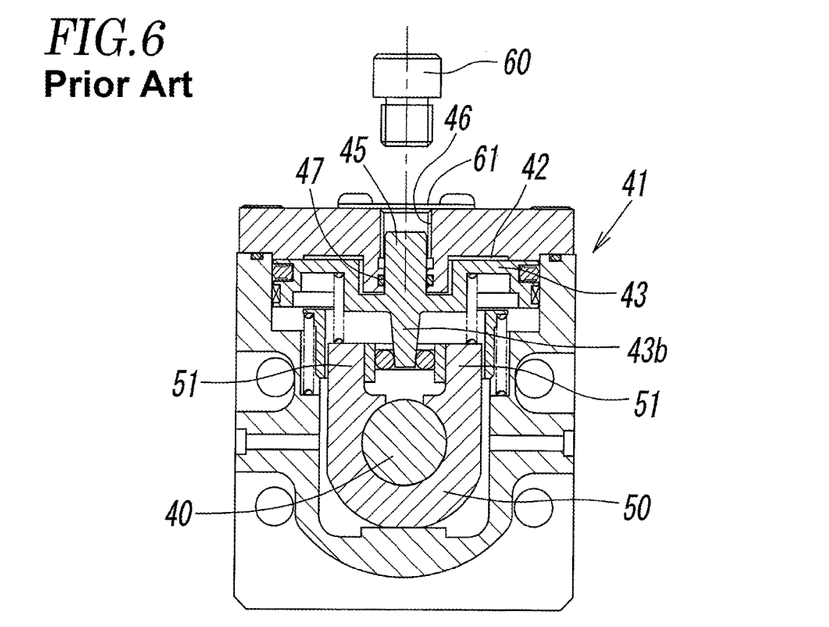
FIG. 6 is a cross sectional view of a known lock device for linear motion rod in a similar position to that in FIG. 2.
Figure 7:
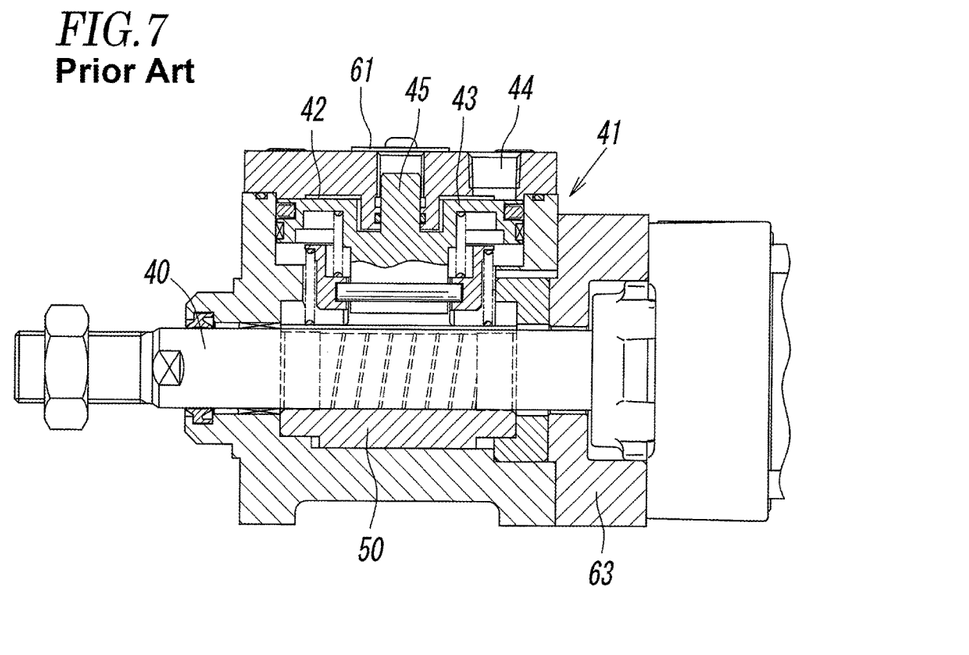
FIG. 7 is a cross sectional view of a known lock device for linear motion rod in a similar position to that in FIG. 3.

Referring to FIGS. 6 and 7, a configuration of a known lock device will be described. A lock release piston 43 is housed in a piston chamber 42 formed inside a lock device body 41, and a supply and discharge port 44 of a pressure fluid that is in communication with the piston chamber 42 is established in the lock device body 41. A pressure projection 45 for pressing the piston 43 in the lock release direction from the outside is integrally formed with the piston 43, and the pressure projection 45 is fitted into a screw hole 46 for screwing a manual operation bolt 60 formed separately with respect to the lock device body 41. Furthermore, the lock device is configured such that lock of a rod 40 of the brake member 50 can be released manually by screwing the manual operation bolt 60 into the screw hole 46 such that the manual operation bolt 60 presses an operation end of the pressure projection 45 and pushes a taper-shaped expansion portion 43b in between a pair of pressure-bearing section 51 of a brake member 50 so as to push and open the pressure-bearing section 51. Note that in FIGS. 6 and 7, a state in which the manual operation bolt 60 is detached from the screw hole 46 and in which a dust-proof cover 61 is screwed to the screw hole 46 is illustrated.

As described above, when a measure is taken in which the pressure projection 45 for manual operation is integrally provided with the lock release piston 43 and in which the pressure projection 45 is pressed with the manual operation bolt 60 formed as a dedicated member for unlocking, the manual operation bolt 60 and the dust-proof cover 61 that closes the screw hole 46 need to be prepared separately, and when not in use, they need to be stored at a different place.

Furthermore, in order to prevent the pressure liquid that is introduced into the piston chamber 42 from the supply and discharge port 44 from leaking, a portion between an inner peripheral surface of the screw hole 46 and an outer peripheral surface of the pressure projection 45 needs to be sealed with a sealing ring 47. In such a case, the sealing ring 47 needs to be attached to a portion inside the screw hole 46 that is different from where the female screw is threaded. Furthermore, the sealing of the sealing ring 47 needs to be performed in the entire range of the stroke length of the piston 43, and the screw hole 46 needs to be formed with a surplus in the axial direction so as to allow the manual operation bolt 60 to be screwed in even when the pressure projection 45 is positioned at an up end. As a result, not only the structure of the device becomes complicated, the screw hole 46 becomes relatively long, and there is a problem in that the length of the lock device body 41 in the up-down direction tends to become large accordingly.

CITATION LIST

Patent Literature

PTL 1: Japanese Unexamined Patent Application Publication No. 2009-68567

SUMMARY OF INVENTION

Technical Problem

The technical challenge of the present invention is to devise a lock device having a brake member that fasten the linear motion rod to lock the rod such that the lock device has a simplified structure and a small size by rationally modifying the design structure.

Solution to Problem

According to an aspect of the present invention, a lock device for a linear motion rod is provided, wherein a lock device body through which the linear motion rod penetrates includes a cylindrically shaped brake member that fastens an outer periphery of the rod so as to lock the rod, a lock release piston that press-opens the brake member so as to unlock the rod, and an operation element for manually operating the piston, the brake member includes a fastening hole in which the rod is inserted, an opening portion formed in an axis direction in a portion of the fastening hole, and a pair of pressure-bearing sections formed on both ends of the opening portion, the piston includes a piston body which is housed in a piston chamber formed in the lock device body in a manner to be displaceable between a lock position and a lock release position, and a taper-shaped expansion member that enters between the pair of pressure-bearing sections when the piston body is displaced to the lock release position so as to press-open the pressure-bearing section, the piston chamber has a pressure chamber therein for applying fluid pressure on a pressure-bearing surface of the piston body, and the lock device body has a supply and discharge port which communicates with the pressure chamber, the operation element includes a shaft formed separately from the piston and threaded in a screw hole of the lock device body, a pressure plate formed on one end of the shaft and located in the pressure chamber, an operation end formed on the other end of the shaft, and a sealing member disposed on the pressure plate so as to surround the shaft, wherein, when the shaft is threaded into the lock release position, the operation end occupies an unextending position with respect to the screw hole while the pressure plate displaces the piston body to the lock release position, and, when the shaft is threaded back to the lock position, the operation end occupies a position such that the operation end extends from the screw hole to the outside while the sealing member of the pressure plate abuts a portion surrounding the screw hole of the lock device body to isolate the screw hole from the pressure chamber.

In the lock device for a linear motion rod having the above configuration, when the operation element is threaded back to the lock position, since the sealing member of the operation element abuts the inner surface of the lock device body around the screw hole in the piston chamber to seal the screw hole, the rod can be unlocked by driving the lock release piston by supplying a pressure fluid to the piston chamber via the supply and discharge port so as to press-open the pair of pressure-bearing sections by using the expansion member. When the pressure fluid is discharged from the piston chamber, the piston is returned to the lock position and the rod is locked.

Further, when the operation element is threaded from the lock position to the lock release position, the piston is pressed by the operation element and is moved to the lock release position so that the expansion member presses-open the pair of pressure-bearing sections. Accordingly, the rod can be manually unlocked.

In the above aspect of the present invention, it is preferable that a recess is formed at a position on the pressure-bearing surface of the piston body where the pressure plate of the operation element abuts, the recess having a diameter larger than a diameter of the pressure plate and a depth larger than a thickness of the pressure plate.

Further, in the above aspect of the present invention, it is preferable that a pair of rollers held by a roller holder in a manner rotatable and displaceable in a direction of coming into contact or being away from each other are individually interposed between the pair of pressure-bearing sections of the brake member and an expansion member of the piston with an axis being oriented in a direction perpendicular to an insertion direction of the expansion member, and the roller holder has a cylindrical portion having a cylindrical shape, and the roller holder includes two roller supporting holes disposed at opposed positions on one side and the other side of the cylindrical portion, the one end of each of the pair of rollers being fitted in the corresponding one of the two roller supporting holes disposed on the one side and the other end of each of the pair of rollers being fitted in the corresponding one of the two roller supporting holes disposed on the other side, and stopper members that each latch on the corresponding ends of the rollers to prevent the rollers from moving out from the roller supporting holes.

In this case, it is preferable that the cylindrical portion includes insertion holes each traversing the two roller supporting holes on one side or the two roller supporting holes on the other side, and the stopper members each include a plate-shaped portion disposed in the corresponding insertion hole to traverse the corresponding two adjacent roller supporting holes and a latching portion formed on an end portion of the corresponding plate-shaped portion, the latching portion being latched to a recessed step portion formed in an inlet end of the corresponding insertion hole.

According to the preferable aspect of the present invention, the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

Advantageous Effects of Invention

According to the lock device for a linear motion rod of the present invention, since the above operation element for manual operation is constantly mounted in the screw hole of the lock device body, the operation element does not need to be stored at a separate location when not in use.

Further, when the rod is unlocked by attaching the sealing member on the operation element and displacing the piston by the operation element, the sealing member does not seals the above screw hole. However, when an unlocking operation by using a piston is performed by displacing the operation element to the lock position, a pressure fluid can be supplied to the pressure chamber by the sealing member sealing the screw hole. Accordingly, compared with the known lock device shown in FIGS. 6 and 7, a lock device for a linear motion rod can be provided with a rational design structure as well as a simplified structure and a reduced size.

DESCRIPTION OF EMBODIMENTS

Figure 1:
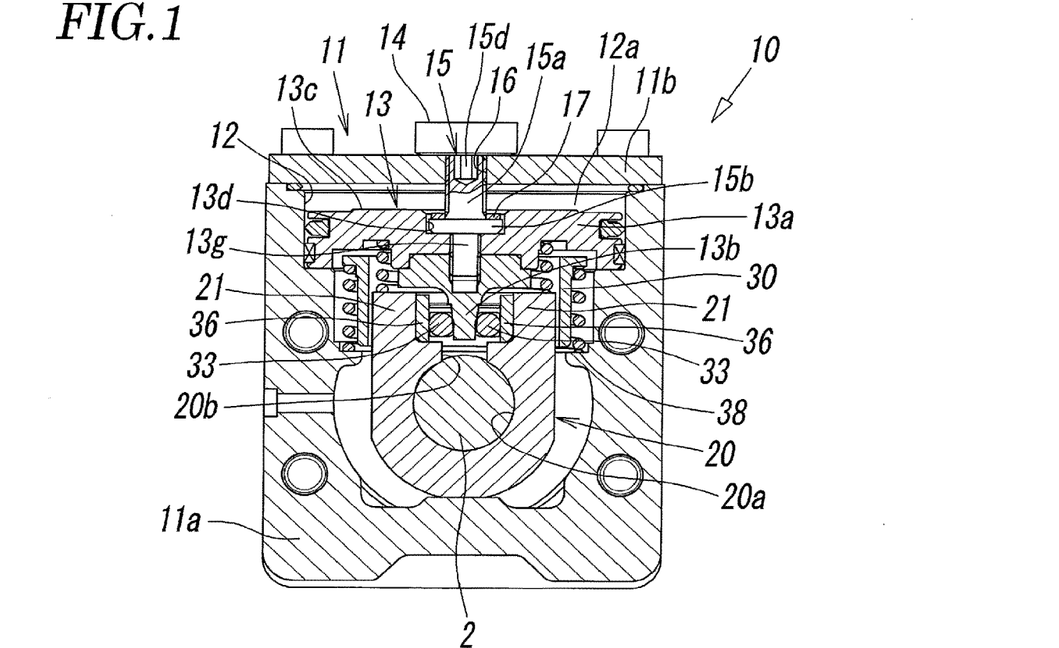
FIG. 1 is a cross sectional view of an example of a lock device for a linear motion rod according to the present invention, taken in the direction perpendicular to the rod, which shows a manually unlocked state of the rod.
Figure 2:
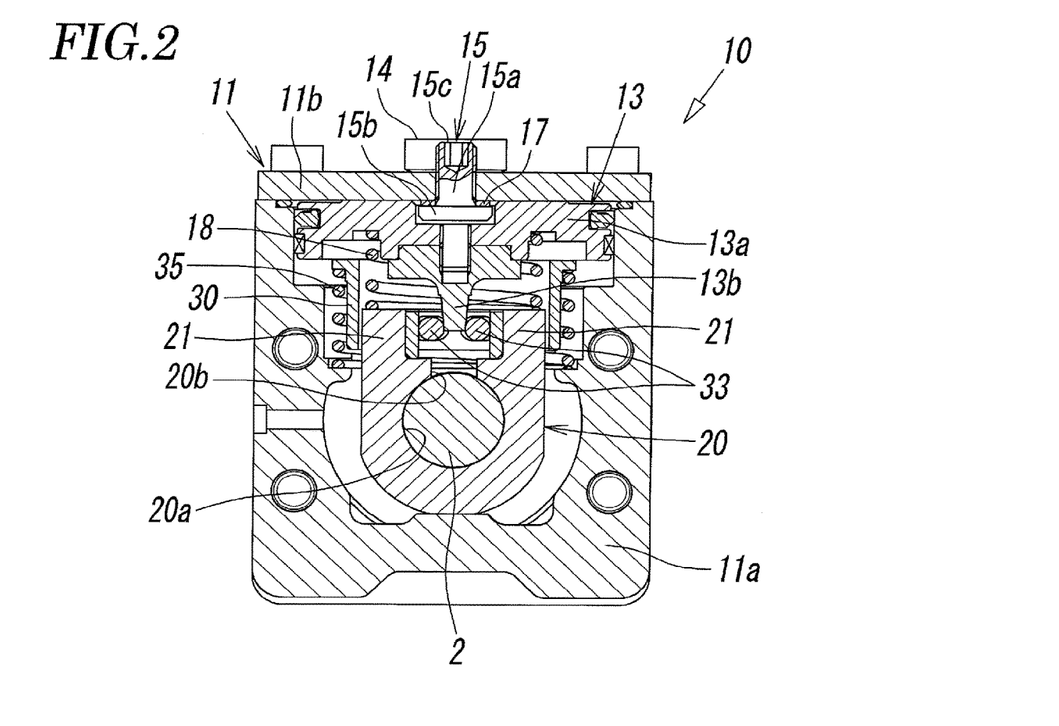
FIG. 2 is a cross sectional view which shows a locked state of the above example.

FIGS. 1 and 2 are cross sectional views of a representative example of a lock device for a linear motion rod according to the present invention taken in the direction perpendicular to the linear motion rod, in which FIG. 1 is a cross sectional view which shows a manually unlocked state and FIG. 2 is a cross sectional view which shows a locked state. Further, FIG. 3 is a vertical cross sectional view of an essential part of the representative example of the lock device for a linear motion rod according to the present invention taken in the direction along the linear motion rod.

Figure 3:
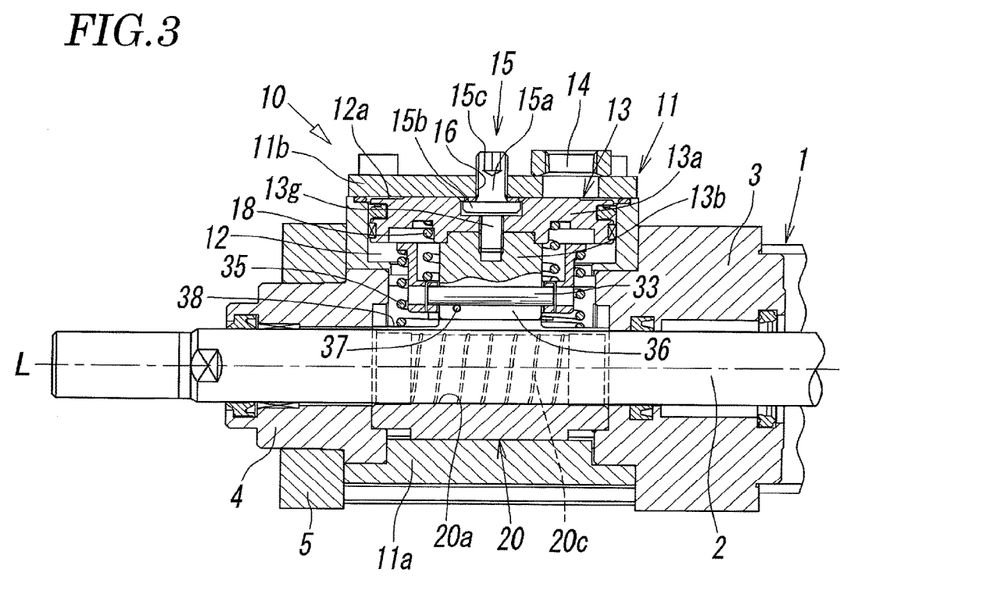
FIG. 3 is a vertical cross sectional view of an essential part of the above example taken in the direction along the linear motion rod.

As shown in FIG. 3, a lock device 10 for a linear motion rod is configured to be mounted on a linear actuator such as a hydraulic cylinder 1 having a rod 2 which moves in a linear motion as a device for locking a movement of the rod 2 in an axis L direction. The lock device 10 is mounted on a rod cover 3 having an exit for the rod 2 on one end of the linear actuator.

The lock device 10 includes a lock device body 11 in the shape of casing that is fixed to the rod cover 3 of the hydraulic cylinder 1. The lock device body 11 includes a container 11a through which the rod 2 penetrates and an upper lid 11b which covers an upper opening of the container 11a, and is provided with a brake member 20 in the lock device body 11 so as to fasten the outer periphery of the rod 2 to lock the rod.

The brake member 20 is a thick-walled cylindrical member made of a metal which includes a fastening hole 20a having an inner diameter which is slightly smaller than an outer diameter of the rod 2. The brake member 20 includes an opening portion 20b in a slit shape which extends in an axis L direction in a portion of the fastening hole 20a and a pair of pressure-bearing sections 21 on both ends of the opening portion 20b at opposed positions, each of which extends toward the upper lid 11b. A spiral groove 20c is formed on the inner wall of the fastening hole 20a so as to surround the rod 2. The spiral groove 20c serves as an escape for abrasion powders and grease attached on the inner peripheral surface of the fastening hole 20a and the outer peripheral surface of the rod 2 and a discharge port for such abrasion powders and grease.

Further, the lock device body 11 includes a piston chamber 12 formed between an upper part of the container 11a and the upper lid 11b with a piston 13 for lock release being housed in the piston chamber 12 so as to be displaceable toward and away from the rod 2. A pressure chamber 12a is formed between the piston 13 and the upper lid 11b, and the upper lid 11b is provided with a supply and discharge port 14 that communicates with the pressure chamber 12a so as to supply and discharge a pressure fluid. The lock release piston 13 is configured to press-open the pair of pressure-bearing sections 21 of the brake member 20 via rollers 33 and a roller receiver 36 by using a taper-shaped expansion member 13b, which is described later, when a pressure fluid such as compressed air is supplied to the pressure chamber 12a through the supply and discharge port 14. A coil-shaped return spring 18 is interposed between an upper end surface of the pressure-bearing section 21 of the brake member 20 and the piston 13 so as to return the piston 13 to a position of FIG. 2 when the piston 13 is not exerted by a pressure fluid from the supply and discharge port 14.

The upper lid 11b of the lock device body 11 is provided with an operation element 15 that is configured to press a center part of an upper surface of the piston 13 in a lock release direction so as to move the piston 13 to a lock release position with a manual operation. The operation element 15 is a member separately provided from the piston 13 and has a shaft 15a which is externally threaded around the outer surface. When the shaft 15a is threaded into a screw hole 16 formed in the upper lid 11b, the operation element 15 is mounted on the upper lid 11b such that an operation end 15c on the upper end of the shaft 15a faces the outside of the lock device body 11 from the screw hole 16. The operation end 15c has an operation hole 15d so that a tool such as a hexagonal wrench is inserted into the operation hole 15d for rotating operation of the operation element 15.

Further, a disk-shaped pressure plate 15b is formed at a lower end of the shaft 15a of the operation element 15 to be located in the pressure chamber 12a. The pressure plate 15b is formed to be fitted in a circular recess 13d at the center of an upper surface (pressure-bearing surface 13c) of the piston 13, and a lower end surface of the pressure plate 15b abuts the piston 13 in the recess 13d. An annular sealing member 17 is disposed on a portion of an upper end surface of the pressure plate 15b which abuts the inner surface of the upper lid 11b around the screw hole 16 so as to surround the shaft 15a. The recess 13d has a diameter larger than a diameter of the pressure plate 15b and has a depth greater than a thickness of the pressure plate 15b including the sealing member 17.

The operation element 15 is mounted on the lock device body 11 by inserting the shaft 15a into the screw hole 16 from the inside of the lock device body 11 such that the operation end 15c can appear on the outside of the lock device body 11 by rotation operation of the operation element 15. That is, when the shaft 15a is threaded into a lock release position of FIG. 1, the operation end 15c becomes in an unextending state in which the operation end 15c is depressed in the screw hole 16 or becomes substantially flush with the outer end surface of the lock device body 11 (upper lid 11b) while the piston 3 is displaced to the pressure plate 15b to the lock release position. When the shaft 15a is threaded back to a lock position of FIG. 2, the operation end 15c extends from the screw hole 16 to the outside while the sealing member 17 of the pressure plate 15b abuts a portion on the inner surface of the lock device body 11 (upper lid 11b) around the screw hole 16 so as to isolate the screw hole 16 from the pressure chamber 12a.

The operation end 15c of the operation element 15 is moved to extend or not to extend from the screw hole 16 for a purpose of providing an indicator that allows for visual observation from the outside as to whether the rod 2 is locked by threading back of the operation element 15 or the rod 2 is unlocked by threading of the operation element 15. This configuration is advantageous over the known configuration shown in FIGS. 6 and 7 in that the manual operation bolt 60 which also serves as an indicator or the dust-proof cover 61 does not need to be separately stored when not in use and a labor of mounding is not necessary when in use, and the rod 2 can be locked or unlocked by a simple rotation operation of the operation element 15 while the locked or unlocked state of the rod 2 can be displayed by the indicator.

In the lock device 10 of the linear motion rod 2 having the above configuration, when the operation element 15 is manually rotated by using a tool so as to thread the shaft 15a into a deep position in the screw hole 16 of the lock device body 11, the pressure member 15d presses down the lock release piston 13. This allows the pair of pressure-bearing sections 21 of the brake member 20 to be press-opened by the expansion member 13b (see FIG. 1) so that fastening of the rod 2 by the brake member 20 is released. Therefore, the hydraulic cylinder 1 can be freely operated without supplying a pressure fluid to the pressure chamber 12a via the supply and discharge port 14 to drive the piston 13.

When the operation element 15 is threaded back to release pressing of the piston 13 by the pressure member 15d, the brake member 20 is moved back to the lock position due to elastic force of the brake member 20 itself fastening the rod 2 as shown in FIG. 2.

Further, when the rod 2 is locked by threading back the operation element 15, the sealing member 17 of the operation element 15 abuts the inner surface of the lock device body 11 around the screw hole 16 in the pressure chamber 12a so as to seal the screw hole 16 in a stable matter and isolate the screw hole 16 from the pressure chamber 12a. Accordingly, the rod 2 can be unlocked by driving the lock release piston 13 by supplying a pressure fluid to the pressure chamber 12a via the supply and discharge port 14 of the lock device body 11. When the pressure fluid in the pressure chamber 12a is discharged from the supply and discharge port 14, the piston 13 is returned by biasing force of the return spring 18 and the rod 2 is again locked as a matter of course.

As described above, the lock release piston 13 is movable upward and downward by means of a pressure fluid which is supplied to and discharged from the pressure chamber 12a via the supply and discharge port 14 and by using the operation element 15 which is manually operated. Specifically, the lock release piston 13 is configured in the following manner.

That is, the lock release piston 13 includes a circular piston body 13a housed in the piston chamber 12 and the taper-shaped expansion member 13b having a thickness which decreases toward a distal end so as to press-open the pair of pressure-bearing sections 21 of the brake member 20. As seen from FIG. 5, a circular connecting section 13e is disposed at the proximal end of the expansion member 13b such that the piston body 13a and the expansion member 13b are integrally connected when a protrusion of the connecting section 13e is fitted in a circular recess 13f formed in the piston body 13a and a connection screw 13g is threaded into the screw holes of the piston body 13a and the connecting section 13e. In addition, the piston body 13a and the expansion member 13b can be connected by using an appropriate means regardless of the configuration shown in the figure.

In the above configuration, the expansion member 13b, which locally receives a large force to press-open the pair of pressure-bearing sections 21 of the brake member 20 via the rollers 33, which will be described later, and the piston body 13a, on which the fluid pressure of the pressure chamber 12a fully acts and on which a large force scarcely acts locally, can be independently formed. For example, the former can be made of a suitable wear resistant material and the latter can be made of a suitable synthetic resin material. Accordingly, the lock release piston 13 can be inexpensive having high durability.

Furthermore, as described above, the operation element 15 is configured so as to include the sealing member 17 that abuts the inner surface of the lock device body 11 around the screw hole 16, and to seal the potion around the screw hole 16 with the sealing member 17 when locked by threading back of the operation element 15. Compared with the known configuration illustrated in FIGS. 6 and 7, the above configuration is significantly effective in stabilizing the seal of the screw hole 16 and reducing the thickness of the lock device body 11.

That is, as described above in detail, in the known configuration illustrated in FIGS. 6 and 7, since the portion, between the screw hole 46 in which the manual operation bolt 60 is threaded and the pressure projection 45 of the piston 43 fitted in the screw hole 46, is sealed with the seal ring 47 at where a guide hole 46a that is continuous from the screw hole 46 is positioned, the screw hole 46 needs to be formed to have the stroke length of the piston 43 added with a surplus in length of the thread groove for the manual operation bolt 60 to start screwing.

Conversely, in the lock device 10 of the present invention, since the sealing member 17 that abuts a portion around the screw hole 16 is provided on the operation element 15, the screw hole 16 can be made sufficiently short and, as a result, the upper lid 11b of the lock device body 11 can be reduced in thickness and, consequently, the lock device 10 itself can be reduced in thickness and in weight accordingly.

Furthermore, in the lock device 10, when integrally connecting the lock device body 11 housing the brake member 20 to the hydraulic cylinder 1 including the rod 2, by closing one of the end surfaces of the lock device body 11 with the outer surface of the rod cover 3 of the hydraulic cylinder 1, a spacer 63 (see FIG. 7) of the conventional device that is interposed between the lock device body 41 and the hydraulic cylinder 1 is omitted so that the product is devised smaller and lighter. In addition to that, by configuring the lock device body 11 such that the other end surface of the lock device body 11 is closed by an end plate 4 while the end plate 4 through which the rod 2 penetrates is fixed with the press plate 5, some of the parts of the lock device body 11 can be shared between a hydraulic cylinder 1 of another series having a rod 2 with the same size and a hydraulic cylinder 1 that has a rod 2 with a different size by selecting the end plate 4 and the brake member 20 to fit the size of the rod 2.

The pair of rollers 33 which are rotatable about the axis perpendicular to the advancing and retracting direction of the expansion member 13b and the plate-shaped roller receiver 36 against which the rollers 33 abut are disposed to reduce frictional force between the pair of pressure-bearing sections 21 of the brake member 20 and the expansion member 13b of the lock release piston 13 that press-opens the pair of pressure-bearing sections 21 so that the distal end of the expansion member 13b enters between the pair of rollers 33.

Figure 5:
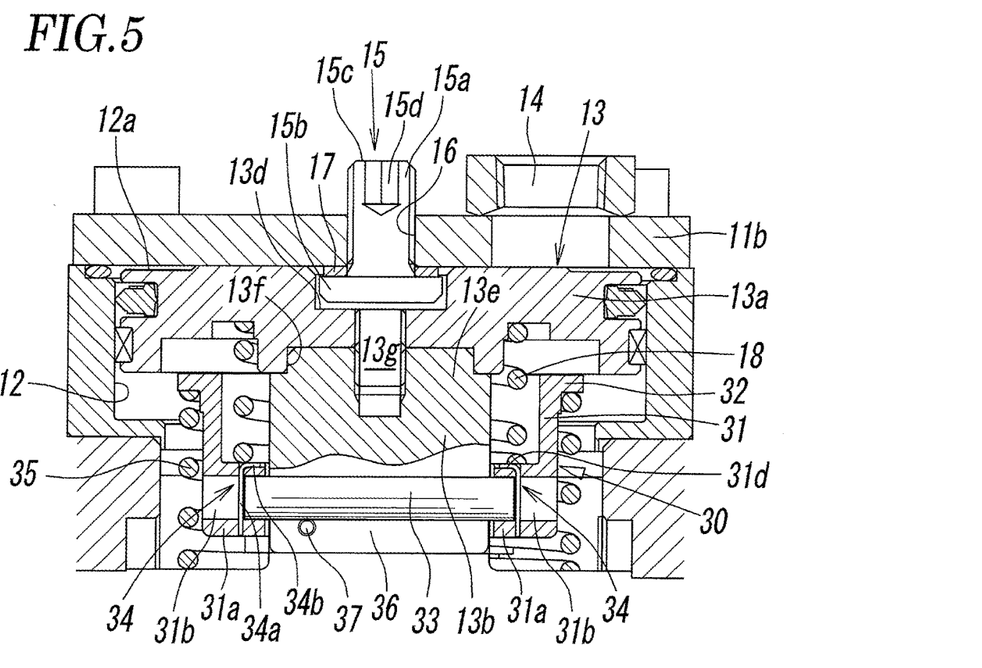
FIG. 5 is an enlarged vertical cross sectional view of an essential part which shows a holding state of the roller in the roller holder.

The roller receiver 36 is a quenched high-strength member for preventing the pressure-bearing section 21 from directly bearing a large load from the rollers 33, and is fixed to the inner surface of the pressure-bearing section 21 by a plurality of set screws 37 which are threaded from the outer surface of the pressure-bearing section 21. The rollers 33 are configured to indirectly apply pressure on the pressure-bearing section 21 via the roller receiver 36. In the example of FIGS. 3 and 5, the set screws 37 are disposed at two positions at the lower left and upper right of the roller receiver 36. In the figure, one set screw 37 at the lower left is shown.

Figure 4:
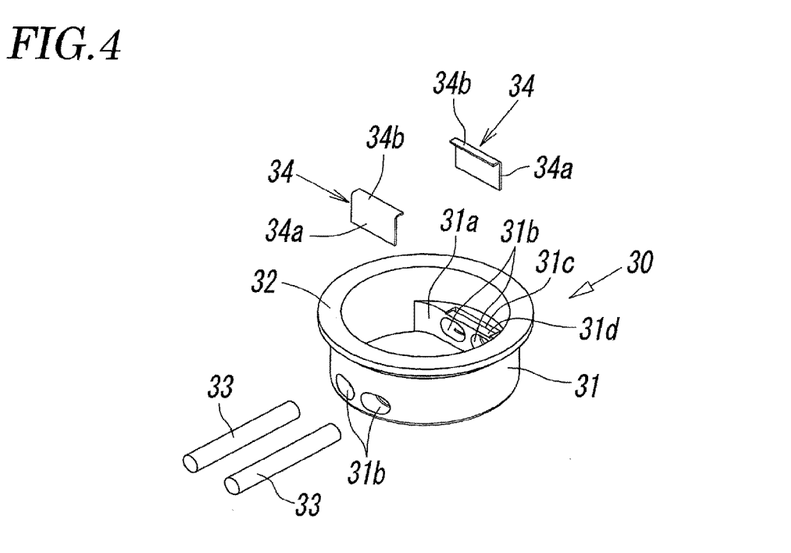
FIG. 4 is an exploded perspective view of a roller holder used in the above example.

Further, the rollers 33 are held by a roller holder 30. As clearly shown in FIGS. 4 and 5, the roller holder 30 includes a cylindrical portion 31 having a cylindrical shape and a flange 32 at the upper end of the cylindrical portion 31, and is disposed in the lock device body 11 so as to surround the pressure-bearing section 21 and the expansion member 13b.

Roller supporting walls 31a, one of which supports one end of the rollers 33 and the other of which supports the other end of the rollers 33, are disposed in the cylindrical portion 31 at opposed positions on the lower end of the cylindrical portion 31. In each of the roller supporting walls 31a, two roller supporting holes 31b having a laterally elongated shape are formed side by side at a small interval. One end of the pair of rollers 33 which are disposed parallel to each other is fitted in the corresponding one of the two roller supporting holes 31b formed on one of the roller supporting walls 31a, and the other end of the pair of rollers 33 is fitted the corresponding one of the two roller supporting holes 31b formed on the other of the roller supporting walls 31a. As the expansion member 13b moves upward and downward, the pair of rollers 33 are moved toward and away from each other within the range of the length of the roller supporting hole 31b.

The roller supporting holes 31b penetrate the roller supporting walls 31a and the cylindrical portion 31 from the inner side to the outer side of the cylindrical portion 31, and in order to prevent the rollers 33 moving in the own axis direction from moving out from the roller supporting holes 31b, slit-shaped insertion holes 31c that traverse the two adjacent roller supporting holes 31b are provided in the vertical direction (the up-down direction in the drawing) and stopper members 34 each having a length that extends across the two roller supporting holes 31b are inserted so as to close the roller supporting holes 31b.

Each stopper member 34 is an L-shaped member and includes a plate-shaped portion 34a that is fitted in the corresponding insertion hole 31c, and a latching portion 34b that continues from an upper end of the plate-shaped portion 34a at a right angle. Each latching portion 34b is latched to a recessed step portion 31d that is formed in an upper end (an inlet end) of the corresponding insertion hole 31c.

The stopper member 34 may be formed by bending a metal plate into an L-shape, for example.

However, the stopper member 34 is not limited to such a structure and may be any member that can prevent the pair of rollers 33 from moving out from the roller supporting holes 31b.

The roller holder 30 configured in the above manner not only has a simple configuration compared with that illustrated in FIGS. 5 to 9 of PTL 1, but is substantially easy to assemble.

Further, the roller holder 30 is configured to be slightly movable in the movement direction of the piston 13 so that the pair of rollers 33 smoothly roll between the pair of pressure-bearing sections 21 of the brake member 20 and the taper-shaped expansion member 13b of the lock release piston 13, and is constantly biased toward the piston 13 by a return spring 35, which is interposed between the flange 32 and a shoulder 38 formed on the container 11a of the lock device body 11. When the piston 13 moves up for locking, the roller holder 30 moves up along with the rollers 33 by the force of the return spring 35 as shown in FIG. 2, and when the piston 13 moves down for unlocking, the roller holder 30 moves down along with the rollers 33 as shown in FIG. 1.

Furthermore, when the roller holder 30 moves up to the lock position of FIG. 2, the upper end surface of the roller supporting walls 31a becomes substantially flush with the upper end surface of the pressure-bearing sections 21 of the brake member 20. Accordingly, the lower end of the return spring 18 abuts the latching portions 34b of the stopper members 34 such that the stopper members 34 are prevented from moving out from the insertion holes 31c.

On the other hand, when the roller holder 30 moves clown to the lock release position of FIG. 1, the upper end surface of the roller supporting wall 31a occupies a position lower than the upper end surface of pressure-bearing sections 21 of the brake member 20. However, a difference between them is smaller than the height of the plate-shaped portion 34a of the stopper member 34. Accordingly, even if the stopper member 34 is displaced in the direction of moving out from the insertion hole 31c, it abuts the return spring 18 before moving out from the insertion hole 31c and is prevented from being further displaced. Since the stopper member 34 is prevented from completely moving out, moving out of the rollers 33 can be still prevented.

Therefore, the return spring 18 has both functions of returning the piston 13 and preventing moving out of the stopper member 34.

REFERENCE SIGNS LIST 1 hydraulic cylinder
2 rod
3 rod cover
4 end plate
10 lock device
11 lock device body
12 piston chamber
12a pressure chamber
13 piston
13a piston body
13b expansion member
13c pressure-bearing surface
13f recess
14 supply and discharge port
15 operation element
15a shaft
15b pressure plate
15c operation end
16 screw hole
17 sealing member
20 brake member
20a fastening hole
20b opening portion
21 pressure-bearing section
30 roller holder
31 cylindrical portion
31b roller supporting hole
31c insertion hole
31d recessed step portion
33 roller
34 stopper member
34a plate-shaped portion
34b latching portion
L axis

The invention claimed is:

1. A lock device for a linear motion rod 2, wherein a lock device body through which the linear motion rod penetrates includes a cylindrically shaped brake member 20 that fastens an outer periphery of the rod so as to lock the rod, a lock release piston 13 that press-opens the brake member so as to unlock the rod, and an operation element 15 for manually operating the piston, the brake member 20 includes a fastening hole in which the rod is inserted, an opening portion formed in an axis direction in a portion of the fastening hole, and a pair of pressure bearing sections 21 formed on both ends of the opening portion, the piston 13 includes a piston body 13a which is housed in a piston chamber 12 formed in the lock device body in a manner to be displaceable between a lock position and a lock release position, and a taper-shaped expansion member 13b that enters between the pair of pressure bearing sections 21 when the piston body is displaced to the lock release position so as to press-open the pressure-bearing section, the piston chamber 12 has a pressure chamber 12a therein for applying fluid pressure on a pressure-bearing surface of the piston body, and the lock device body has a supply and discharge port 14 which communicates with the pressure chamber, and the operation element 15 includes a shaft 15a formed separately from the piston and threaded in a screw hole 16 of the lock device body 11, a pressure plate 15b formed on one end of the shaft and located in the pressure chamber 12a, an operation end formed on the other end of the shaft, and a sealing member 17 disposed on the pressure plate so as to surround the shaft, and, when the shaft is threaded into the lock release position, the operation end occupies an unextending position with respect to the screw hole 16 while the pressure plate displaces the piston body to the lock release position, and, when the shaft is threaded back to the lock position, the operation end occupies a position such that the operation end extends from the screw hole to the outside while the sealing member 17 of the pressure plate 15b abuts a portion surrounding the screw hole of the lock device body to isolate the screw hole 16 from the pressure chamber 12a.

2. The lock device for a linear motion rod according to claim 1, wherein
a recess is formed at a position on the pressure-bearing surface of the piston body where the pressure plate of the operation element abuts, the recess having a diameter larger than a diameter of the pressure plate and a depth larger than a thickness of the pressure plate.

3. The lock device for a linear motion rod according to claim 2, wherein
a pair of rollers held by a roller holder in a manner rotatable and displaceable in a direction of coming into contact or being away from each other are individually interposed between the pair of pressure-bearing sections of the brake member and an expansion member of the piston with an axis being oriented in a direction perpendicular to an insertion direction of the expansion member, and
the roller holder has a cylindrical portion having a cylindrical shape, and the roller holder includes two roller supporting holes disposed at opposed positions on one side and the other side of the cylindrical portion, the one end of each of the pair of rollers being fitted in the corresponding one of the two roller supporting holes disposed on the one side and the other end of each of the pair of rollers being fitted in the corresponding one of the two roller supporting holes disposed on the other side, and stopper members that each latch on the corresponding ends of the rollers to prevent the rollers from moving out from the roller supporting holes.

4. The lock device for a linear motion rod according to claim 3, wherein
the cylindrical portion includes insertion holes each traversing the two roller supporting holes on one side or the two roller supporting holes on the other side, and
the stopper members each include a plate-shaped portion disposed in the corresponding insertion hole to traverse the corresponding two roller supporting holes and a latching portion formed on an end portion of the corresponding plate-shaped portion, the latching portion being latched to a recessed step portion formed in an inlet end of the corresponding insertion hole.

5. The lock device for a linear motion rod according to claim 4, wherein
the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

6. The lock device for a linear motion rod according to claim 3, wherein
the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

7. The lock device for a linear motion rod according to claim 2, wherein
the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

8. The lock device for a linear motion rod according to claim 1, wherein
a pair of rollers held by a roller holder in a manner rotatable and displaceable in a direction of coming into contact or being away from each other are individually interposed between the pair of pressure-bearing sections of the brake member and an expansion member of the piston with an axis being oriented in a direction perpendicular to an insertion direction of the expansion member, and
the roller holder has a cylindrical portion having a cylindrical shape, and the roller holder includes two roller supporting holes disposed at opposed positions on one side and the other side of the cylindrical portion, the one end of each of the pair of rollers being fitted in the corresponding one of the two roller supporting holes disposed on the one side and the other end of each of the pair of rollers being fitted in the corresponding one of the two roller supporting holes disposed on the other side, and stopper members that each latch on the corresponding ends of the rollers to prevent the rollers from moving out from the roller supporting holes.

9. The lock device for a linear motion rod according to claim 8, wherein
the cylindrical portion includes insertion holes each traversing the two roller supporting holes on one side or the two roller supporting holes on the other side, and
the stopper members each include a plate-shaped portion disposed in the corresponding insertion hole to traverse the corresponding two roller supporting holes and a latching portion formed on an end portion of the corresponding plate-shaped portion, the latching portion being latched to a recessed step portion formed in an inlet end of the corresponding insertion hole.

10. The lock device for a linear motion rod according to claim 9, wherein
the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

11. The lock device for a linear motion rod according to claim 8, wherein
the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

12. The lock device for a linear motion rod according to claim 1, wherein
the lock device body is connected to a hydraulic cylinder having the rod, one end of the lock device body in a direction of the rod is closed by a rod cover, the rod cover being a portion of the hydraulic cylinder, and the other end of the lock device body is closed by an end plate through which the rod penetrates.

* * * * *